(12) United States Patent
Justice et al.

(10) Patent No.: US 6,909,757 B2
(45) Date of Patent: Jun. 21, 2005

(54) METHODS, TRANSMITTERS, AND COMPUTER PROGRAM PRODUCTS FOR TRANSMITTING A SIGNAL BY ADJUSTING A DELAY BETWEEN AN AMPLITUDE COMPONENT OF THE SIGNAL AND A PHASE COMPONENT OF THE SIGNAL BASED ON THE TRANSMISSION POWER

(75) Inventors: Scott R. Justice, Durham, NC (US); Erik L. Bengtsson, Lund (SE); David R. Pehlke, Chapel Hill, NC (US)

(73) Assignee: Ericsson Inc., Research Triangle Park, NC (US)

( * ) Notice: Subject to any disclaimer, the term of this patent is extended or adjusted under 35 U.S.C. 154(b) by 733 days.

(21) Appl. No.: 09/854,649

(22) Filed: May 14, 2001

(65) Prior Publication Data

US 2002/0168020 A1 Nov. 14, 2002

(51) Int. Cl.$^7$ .............................................. H04L 27/36
(52) U.S. Cl. ...................... 375/297; 375/298; 455/110; 455/127.1; 455/522
(58) Field of Search ................................ 375/261, 295, 375/296, 297, 298; 370/318; 455/522, 127.1, 127.2, 110

(56) References Cited

U.S. PATENT DOCUMENTS

| 6,222,878 B1 | 4/2001 | McCallister et al. ......... 375/225 |
| 6,703,897 B2 * | 3/2004 | O'Flaherty et al. ......... 330/149 |
| 2002/0072346 A1 * | 6/2002 | Kato et al. .................. 455/403 |

FOREIGN PATENT DOCUMENTS

| WO | WO/0054431 | 9/2000 | ............ H04B/7/01 |

OTHER PUBLICATIONS

Copy of International Search Report for PCT/US02/15173 mailed Jan. 27, 2003.

Lin et al., "Computer Simulation and Measurement of Error Vector Magnitude (EVM) and Adjacent–Channel Power Radio (ACPR) for Digital Wireless Communication RF Power Amplifiersm," IEEE 50th Vehicular Technology Conference, Sep. 19, 1999, pp. 2024–2028.

Sevic et al. "Simulation of Power Amplifier Adjacent–Channel Power Ratio for Digital Wireless Communications Systems," IEEE 47th Vehicular Technology Conference, May 4, 1997, pp. 681–685.

Application Entitled: *IQ Modulation Systems and Methods that Use Separate Phase and Amplitude Signal Paths*; U.S. Appl. No. 09/703,037, filed Oct. 31, 2001.

* cited by examiner

*Primary Examiner*—Amanda T. Le
(74) *Attorney, Agent, or Firm*—Myers Bigel Sibley & Sajovec (57) ABSTRACT

Embodiments of methods, transmitters, and computer program products are provided for transmitting a signal by adjusting a delay between an amplitude component of the signal and a phase component of the signal based on the transmission power. Error vector magnitude and adjacent channel power ratio are two common criteria used in evaluating transmitter performance. By adjusting the delay between the amplitude component of the transmitted signal and the phase component of the transmitted signal, the error vector magnitude and/or the adjacent channel power ratio may be reduced. The particular delay value that provides the best error vector magnitude performance and/or adjacent channel power ratio performance may differ based on the transmission power level. Therefore, the delay value is adjusted based on the transmission power.

42 Claims, 8 Drawing Sheets

METHODS, TRANSMITTERS, AND COMPUTER PROGRAM PRODUCTS FOR TRANSMITTING A SIGNAL BY ADJUSTING A DELAY BETWEEN AN AMPLITUDE COMPONENT OF THE SIGNAL AND A PHASE COMPONENT OF THE SIGNAL BASED ON THE TRANSMISSION POWER

BACKGROUND OF THE INVENTION

The present invention relates generally to the field of communication, and, more particularly, to communication transmitters.

To transmit digital data over a wireless or public switched telephone network (PSTN), modulation may be used to code the digital information into analog signals. Common modulation techniques modulate digital information into two orthogonal signal components, referred to as the in-phase component and the quadrature component. Thus, digital information may be represented by a signal comprising a combination of the in-phase and quadrature components.

Figure 1:
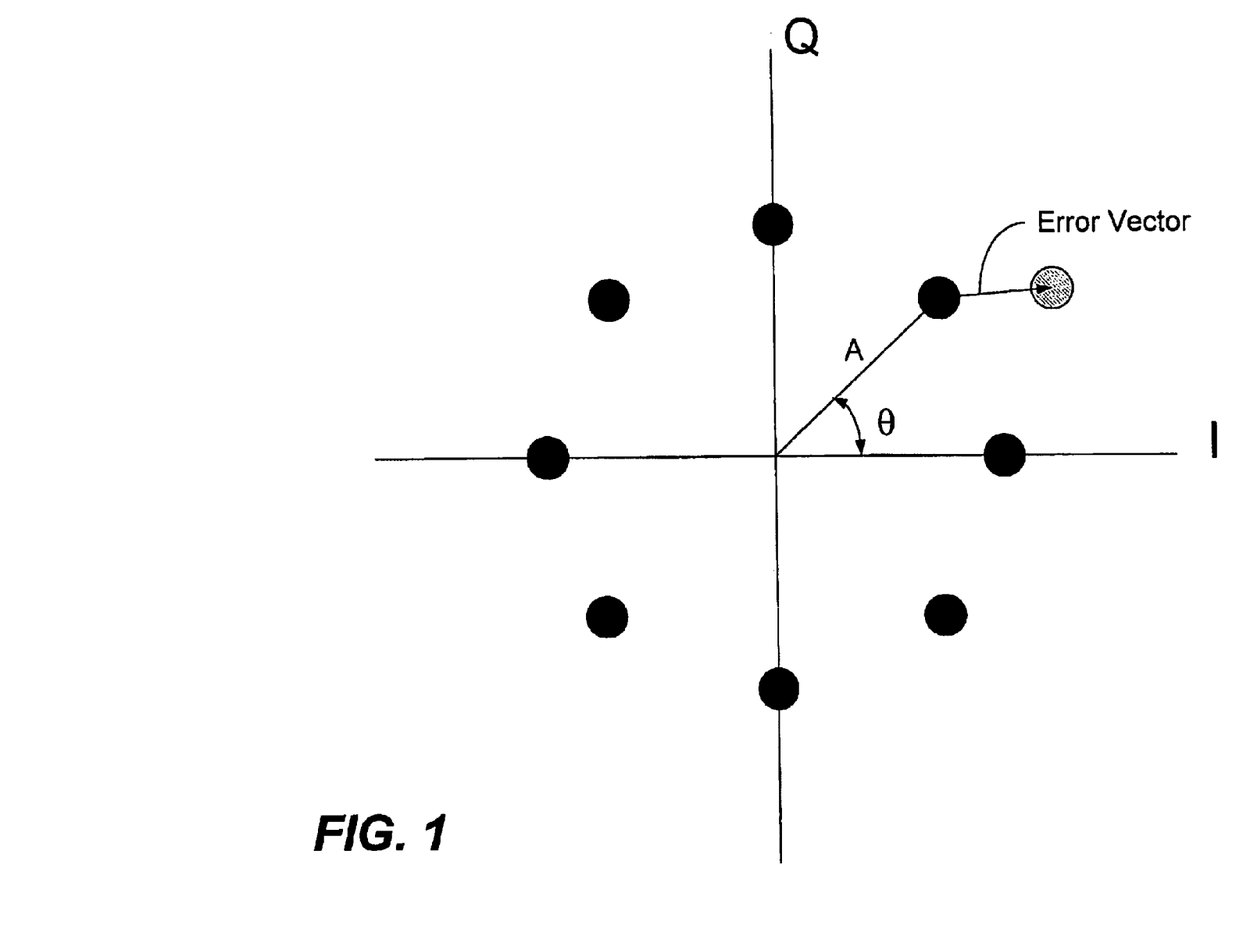
FIG. 1 is a diagram of a symbol constellation that illustrates an error vector between an ideal symbol and a received symbol.

The signal set representing the digital information is commonly displayed in a two-dimensional signal space or constellation diagram in which the number of points in the constellation is given by $2^n$, where n is the number of bits to be encoded. For example, FIG. 1 illustrates an eight-symbol constellation diagram where the horizontal axis represents the in-phase component, the vertical axis represents the quadrature component, and each symbol represents three bits of data. Note that the three bits of data represented by each point in the constellation may be provided from the output of an encoder, such as a convolutional encoder, that operates on the bits of a message signal to be transmitted.

A received symbol may not correspond precisely to the ideal symbol shown in the constellation diagram due to noise associated with the communication channel and imperfections of both the transmitter and receiver. As shown in FIG. 1, the difference between a received symbol (shaded constellation point) and an ideal symbol (solid constellation point) can be represented as an error vector. Generally, the smaller the magnitude of the error vector, the better the performance of the communication system. Error vector magnitude is the root mean square (RMS) value of the error vector over time at the precise time instance of the symbol clock transitions. EVM is typically normalized to either the amplitude of the outermost symbol, or the square root of the average symbol power. Each symbol may be represented as a particular amplitude A and phase θ. Thus, the transmitted signal may vary in amplitude and/or phase to transmit a string of consecutive symbols. The amplitude and phase components of a signal may be processed separately in a transmitter. It has been found that the EVM for a communication system may vary based on the delay applied between the amplitude A of a transmitted signal and the phase θ of the transmitted signal. Thus, a transmitter may be programmed to operate using a delay that on average provides acceptable EVM performance.

Another performance criterion that may be used to evaluate a communication system is adjacent channel power. A transmitter is typically designed to focus its transmission power in a limited bandwidth that corresponds to the communication channel currently used by the transmitter. Unfortunately, a typical transmitter does not achieve zero power spectral density outside of its current communication channel. The signal transmission power that is measured at frequencies adjacent the communication channel bandwidth when the transmitter transmits is generally known as adjacent channel power (ACP). The ratio of ACP with the power within the main channel bandwidth is defined as adjacent channel power ratio (ACPR) and is the definitive measure of spectral re-growth due to transmitter non-linearity. These signals outside of the bandwidth used by the transmitter for communication may interfere with other communication sessions operating on those frequencies. Accordingly, it is generally desirable to reduce the adjacent channel power ratio to an acceptably low level. Like EVM, it has been found that the ACPR for a communication system may vary based on the delay applied between the amplitude A of a transmitted signal and the phase θ of the transmitted signal. Thus, a transmitter may be programmed to operate using a delay that on average provides acceptable ACPR performance.

Unfortunately, a delay that provides acceptable ACPR performance may not necessarily provide acceptable EVM performance and vice versa. Moreover, a delay that provides acceptable ACPR and/or EVM performance at one transmit power level may not necessarily provide acceptable ACPR and/or EVM performance at another transmit power level.

SUMMARY OF THE INVENTION

Embodiments of the present invention provide methods, transmitters, and computer program products for transmitting a signal by adjusting a delay between an amplitude component of the signal and a phase component of the signal based on the transmission power. Error vector magnitude and adjacent channel power ratio are two common criteria used in evaluating transmitter performance. By adjusting the delay between the amplitude component of the transmitted signal and the phase component of the transmitted signal, the error vector magnitude and/or the adjacent channel power ratio may be reduced. The particular delay value that provides the best error vector magnitude performance and/or adjacent channel power ratio performance may differ based on the transmission power level. Therefore, according to embodiments of the present invention, the delay value is adjusted based on the transmission power.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures. It will also be understood that when an element is referred to as being "connected" or "coupled" to another element, it can be directly connected or coupled to the other element or intervening elements may also be present. In contrast, when an element is referred to as being "directly connected" or "directly coupled" to another element, there are no intervening elements present.

The present invention may be embodied as methods, communication devices, communication systems, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Figure 2:
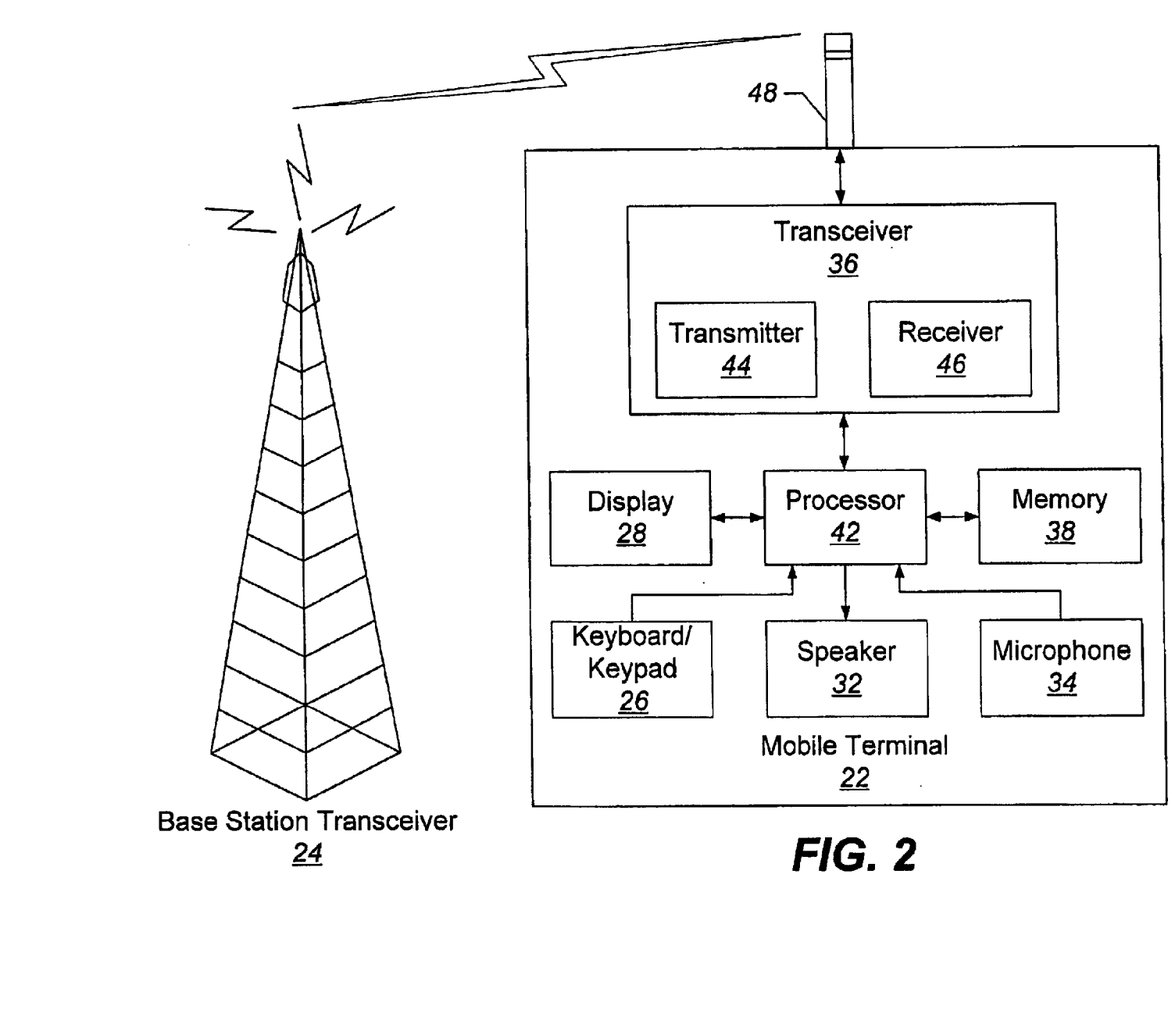
FIG. 2 is a schematic that illustrates exemplary radiotelephone communication systems in accordance with embodiments of the present invention.

Referring now to FIG. 2, an exemplary radiotelephone communication system, in accordance with embodiments of the present invention, comprises a mobile terminal 22 and a base station transceiver 24. The mobile terminal 22 may comprise a keyboard/keypad 26, a display 28, a speaker 32, a microphone 34, a transceiver 36, and a memory 38 that communicate with a processor 42. The transceiver 36 typically comprises a transmitter circuit 44 and a receiver circuit 46, which respectively transmit outgoing radio frequency signals to the base station transceiver 24 and receive incoming radio frequency signals from the base station transceiver 24 via an antenna 48. The radio frequency signals transmitted between the mobile terminal 22 and the base station transceiver 24 may comprise both traffic and control signals (e.g., paging signals/messages for incoming calls), which are used to establish and maintain communication with another party or destination.

The foregoing components of the mobile terminal 22 may be included in many conventional mobile terminals and their functionality is generally known to those skilled in the art. It should be further understood, that, as used herein, the term "mobile terminal" may include a cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

The base station transceiver 24 comprises the radio transceiver(s) that define an individual cell in a cellular network and communicate with the mobile terminal 22 and other mobile terminals in the cell using a radio-link protocol. Although only a single base station transceiver 24 is shown, it will be understood that many base station transceivers may be connected through, for example, a mobile switching center and other devices to define a wireless communication network.

Although the present invention may be embodied in communication devices or systems, such as the mobile terminal 22 and/or the base station transceiver 24, the present invention is not limited to such devices and/or systems. Instead, the present invention may be embodied in any method, transmitter, communication device, communication system, or computer program product that facilitates signal transmission by adjusting a delay between an amplitude component of the signal and a phase component of the signal based on the transmission power.

Figure 3:
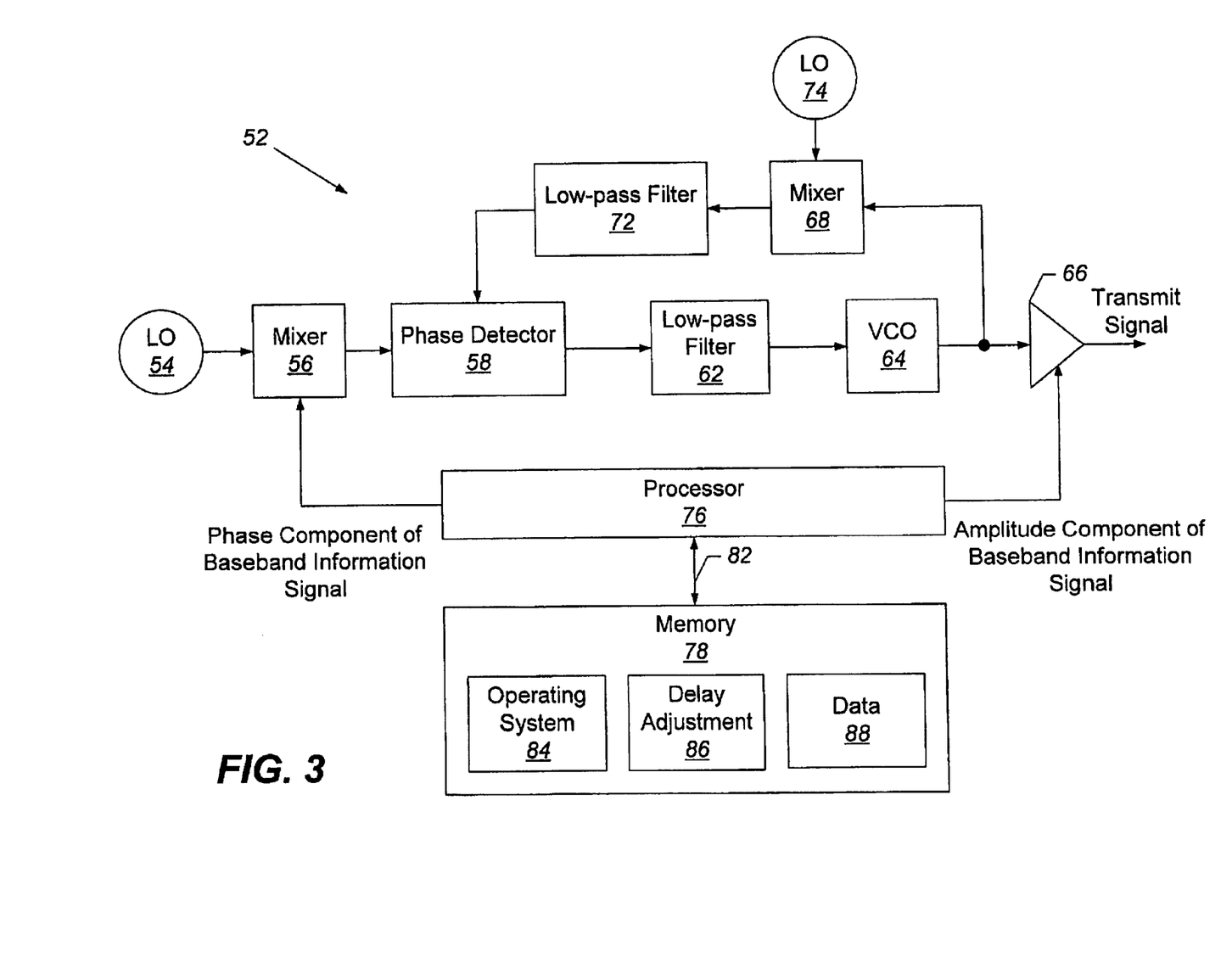
FIG. 3 is a block diagram that illustrates methods, transmitters, and computer program products for transmitting a signal by adjusting a delay between an amplitude component of the signal and a phase component of the signal based on the transmission power in accordance with embodiments of the present invention.

FIG. 3 is a block diagram of a transmitter 52 that illustrates methods, transmitters, and computer program products in accordance with embodiments of the present invention. The transmitter 52 comprises a local oscillator 54, a mixer circuit 56, a phase detector circuit 58, a low-pass filter 62, a voltage controlled oscillator (VCO) 64, and a power amplifier 66, which are electrically connected in series as shown. A feedback loop is formed from the output of the VCO 64 through a mixer circuit 68 and a low pass filter 72 to the phase detector circuit 58. A local oscillator 74 is electrically connected to the mixer circuit 68.

A processor 76 is electrically connected to a memory 78 via an address/data bus 82. The processor 76 is also electrically connected to the mixer circuit 56 and the power amplifier 66 as shown. The processor 76 may be, for example, a commercially available or custom microprocessor. The memory 78 is representative of the overall hierarchy of memory devices containing the software and data used to implement the functionality of a communication device or system, such as, for example, the mobile terminal 22 or base station transceiver 24 of FIG. 2. The memory 78 may include, but is not limited to, the following types of devices: cache, ROM, PROM, EPROM, EEPROM, flash, SRAM, and DRAM.

As shown in FIG. 3, the memory 78 may hold three or more major categories of software and data: the operating system 84; the delay adjustment program module 86; and the data module 88. The operating system 84 controls the operation of the communication device or communication system software, including managing software resources and coordinating execution of programs. Typically, the operating system 84 is designed for real-time communication applications.

The delay adjustment module 86 may be configured to adjust the delay applied between an amplitude component of a signal to be transmitted and a phase component of the signal to be transmitted. As discussed hereinabove, a transmission signal may be viewed as comprising symbols having amplitude and phase information associated therewith. Accordingly, the processor 76 may separate the phase information from the amplitude information as shown in FIG. 3 and provide a baseband information signal containing only the phase information to the mixer circuit 56. The amplitude information is provided directly to the power amplifier 66. Because there is a delay for the phase component of the information signal to reach the power amplifier 66, the delay adjustment module 86 adjusts a delay between the phase component of the information signal and the amplitude component of the information signal to improve error vector magnitude (EVM) and adjacent channel power ratio (ACPR). Specifically, in accordance with embodiments of the present invention, the delay adjustment module 86 adjusts a delay between the phase component of the information signal and the amplitude component of the information signal based on a transmit power of the information signal as will be discussed in detail hereinafter.

Finally, the data module 88 represents both the static and dynamic data used by the software modules in the memory 78 to carry out their operations. In particular, the data module 88 may include a data structure that associates delay values between an amplitude component of a signal and a phase component of a signal with transmit power levels of the power amplifier 66.

Although FIG. 3 illustrates an exemplary software architecture that may facilitate the transmission of a signal by adjusting a delay between an amplitude component of the signal and a phase component of the signal based on the transmission power, it will be understood that the present invention is not limited to such a configuration, but is intended to encompass any configuration capable of carrying out operations described herein.

Computer program code for carrying out operations of the respective program modules may be written in a high-level programming language, such as C or C++, for development convenience. Nevertheless, some modules or routines may be written in assembly language or even micro-code to enhance performance and/or memory usage. It will be further appreciated that the functionality of any or all of the program modules may also be implemented using discrete hardware components, a single application specific integrated circuit (ASIC), or a programmed digital signal processor or microcontroller.

Exemplary operations of the transmitter 52 will now be described. The local oscillator 54 generates an intermediate frequency signal, which is provided to the mixer circuit 56. The mixer circuit 56 multiplies the signal output from the local oscillator 54 by the phase component of the baseband information signal and generates an output signal at a frequency corresponding to the frequency of the signal output from the local oscillator 54. The phase detector 58 is responsive to the output signal from the mixer circuit 56 and a feedback signal. In particular, the phase detector 58 generates an output signal having a low-frequency component that is representative of the phase difference between the output signal of the mixer circuit 56 and the feedback signal. The low-pass filter 62 passes the low-frequency component output from the phase detector 58 and blocks higher frequencies. The VCO 64 generates an RF output signal in response to the low-frequency component of the signal output from the phase detector 58. The RF output signal from the VCO 64 includes the phase component from the baseband information signal, but does not include the amplitude component. The power amplifier 66 generates a transmit signal in response to the RF output signal from the VCO 64 and the amplitude component of the baseband information signal.

As discussed in the foregoing, the phase detector 58 is responsive to a feedback signal. To generate the feedback signal, a mixer circuit 68 generates an output signal in response to the RF output signal from the VCO 64 and a reference signal provided by the local oscillator 74. Preferably, the local oscillator 74 generates a reference signal having a frequency equal to the sum of the frequency of the RF output signal from the VCO 64 and the intermediate frequency of the signal output from the local oscillator 54. The output signal generated by the mixer circuit 68 includes frequencies corresponding to both the difference between and the sum of the frequency of the RF output signal from the VCO 64 and the frequency of the reference signal provided by the local oscillator 74. The low-pass filter 72 passes the frequency corresponding to the frequency difference between the RF output signal from the VCO 64 and the reference signal provided by the local oscillator 74 and provides this signal as a feedback signal to the phase detector 58. Thus, the phase detector 58, low-pass filter 62, VCO 64, mixer circuit 68, local oscillator 74, and low-pass filter 72 form a phase locked loop for generating an RF output signal for transmission.

The present invention is described hereinafter with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 4:
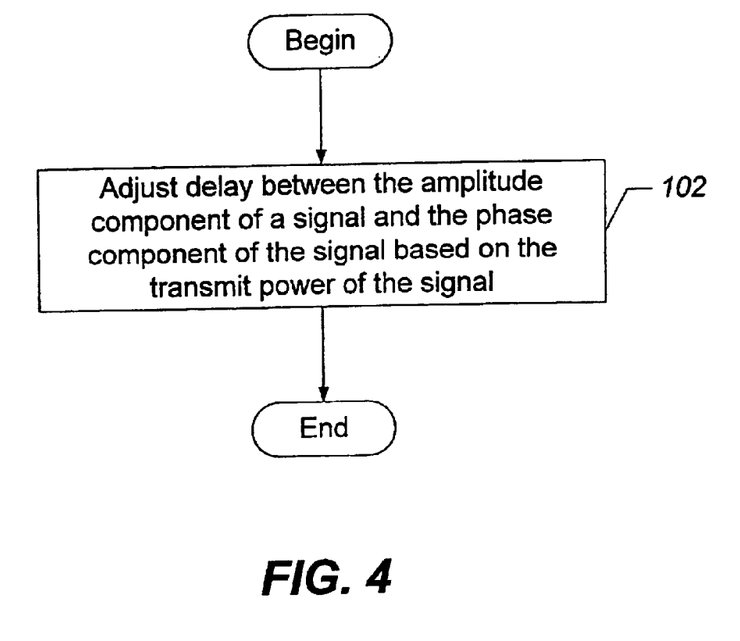
FIGS. 4–5 are flowcharts that illustrate operations of methods, transmitters, and computer program products for transmitting a signal by adjusting a delay between an amplitude component of the signal and a phase component of the signal based on the transmission power in accordance with embodiments of the present invention.

With reference to the flowcharts of FIGS. 4–5 and 8–11, and the block diagram of FIG. 3, exemplary operations of methods, transmitters, and computer program products, in accordance with embodiments of the present invention, will be described hereafter. Referring now to FIG. 4, the delay adjustment module 86 through the processor 76 adjusts the delay between the amplitude component of a signal and the phase component of the signal based on the transmit power of the signal at block 102. The present invention stems from the realization that a single delay value may not provide acceptable EVM performance and/or ACPR performance at all transmit power levels, such as low power levels and/or high power levels where the power amplifier 66 enters saturation. This is illustrated, for example, in FIGS. 6 and 7, which graph EVM and ACPR versus delay for different transmit power levels. As can be seen from FIGS. 6 and 7, a preferred delay that reduces EVM and/or ACPR at one transmit power level is less preferred at another transmit power level.

Figure 5:
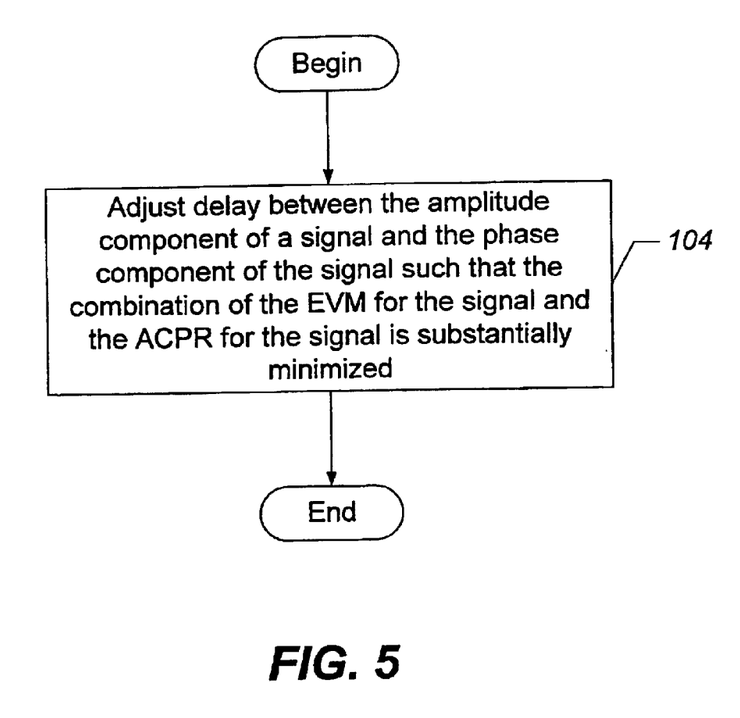

In accordance with further embodiments of the present invention illustrated in FIG. 5, the delay adjustment module 86 through the processor 76 adjusts the delay between the amplitude component of a signal and the phase component of the signal such that the combination of the EVM for the signal and the ACPR for the signal is substantially minimized at block 104. An example of a function for substantially minimizing the combination ($\zeta$) of the EVM for a signal and the ACPR for the signal, in accordance with embodiments of the present invention, is shown below:

$$\zeta = f(EVM, ACPR) = \sqrt{\frac{(EVM - EVM_{MAX})^2}{EVM_{MAX}^2} W_{EVM} + \frac{(ACPR - ACPR_{MAX})^2}{ACPR_{MAX}^2} W_{ACPR}},$$

where $EVM_{MAX}$ is the maximum allowable EVM for the application, $ACPR_{MAX}$ is the maximum allowable ACPR for the application, $W_{EVM}$ is a weighting function coefficient for the EVM term, and $W_{ACPR}$ is a weighting function coefficient for the ACPR term.

Figure 6:
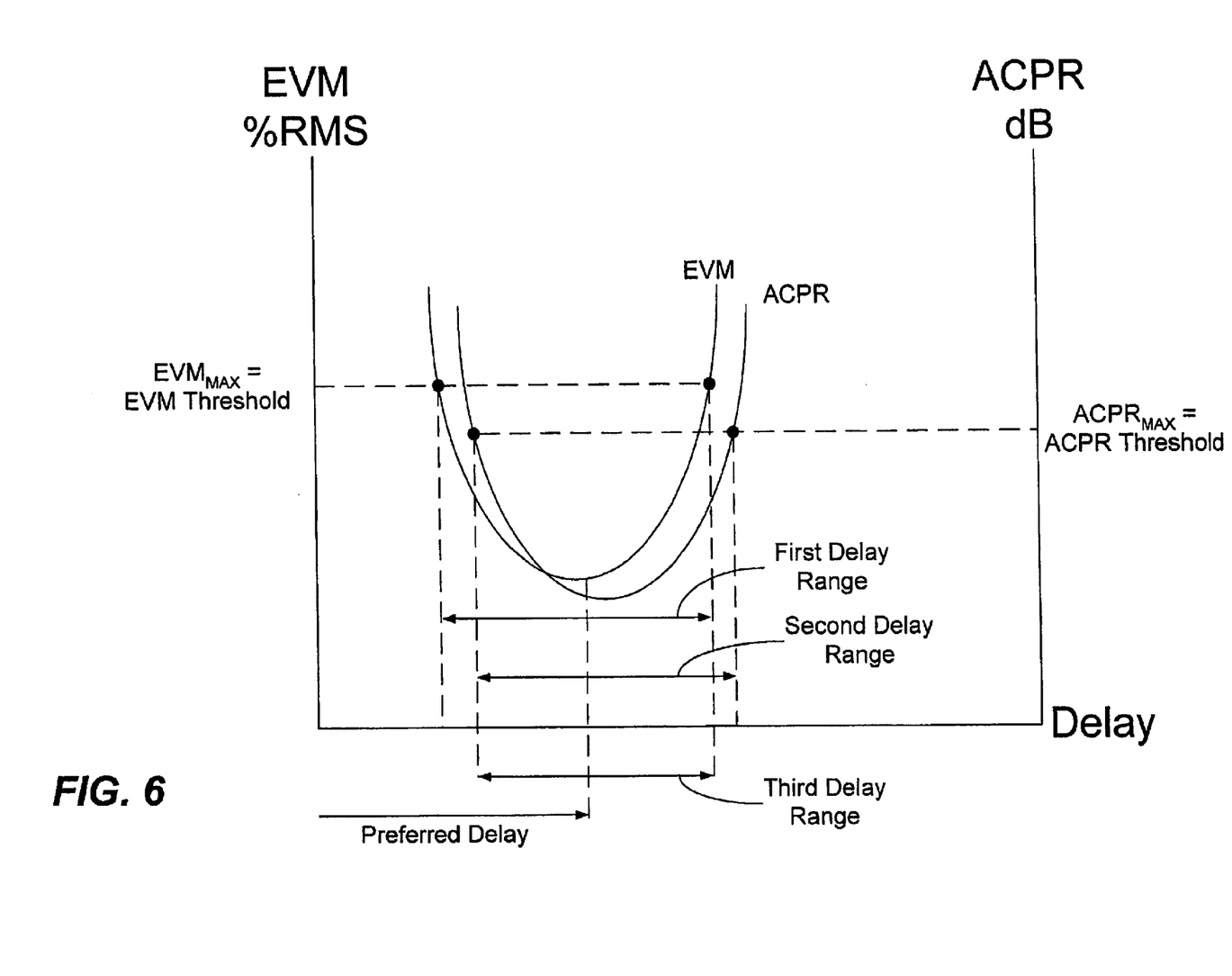
FIGS. 6–7 are graphs that illustrate error vector magnitude and adjacent channel power ratio versus delay between an amplitude component of a signal and a phase component of the signal in accordance with embodiments of the present invention.
Figure 7:
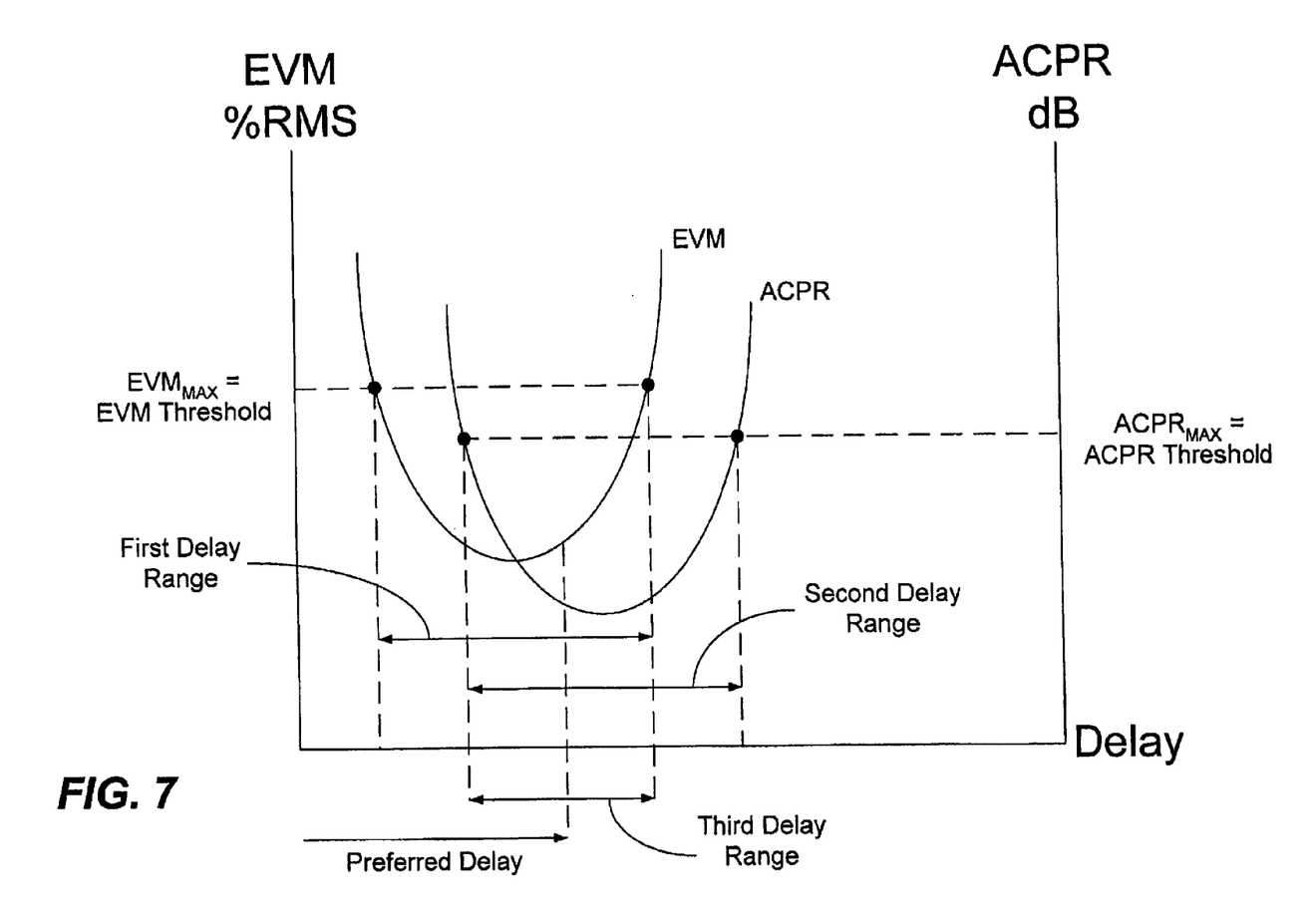
Figure 8:
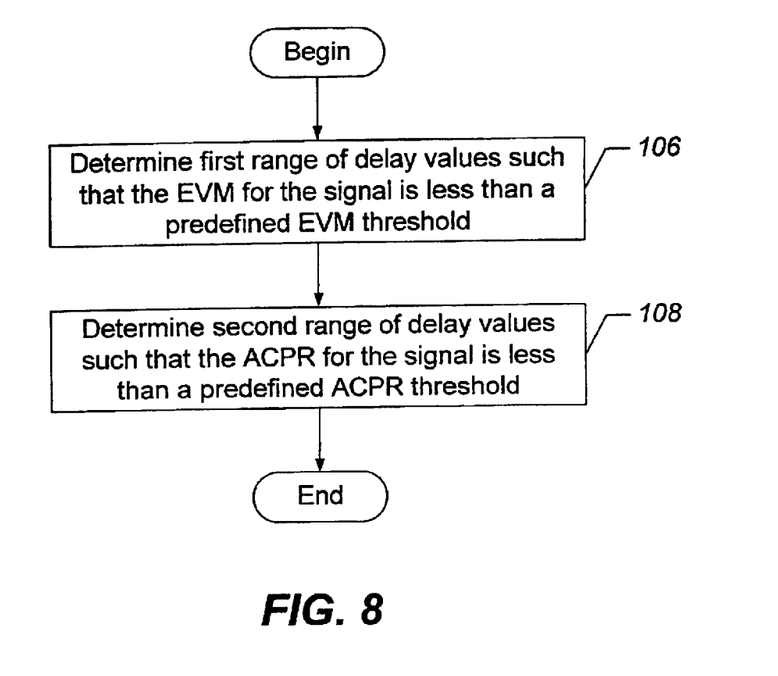
FIGS. 8–11 are flowcharts that illustrate further operations of methods, transmitters, and computer program products for transmitting a signal by adjusting a delay between an amplitude component of the signal and a phase component of the signal based on the transmission power in accordance with embodiments of the present invention.

Referring now to FIG. 6, the EVM and ACPR performance curves are relatively similar at that particular transmit power level. Thus, a preferred delay that substantially minimizes the combination of the EVM for the signal and the ACPR for the signal is relatively close to both the EVM and ACPR minimums. By contrast, the EVM and ACPR performance curves of FIG. 7 are not as close to one another at that particular transmit power level. Accordingly, by selecting a delay that attempts to improve only EVM performance or only ACPR performance, the overall performance of the communication system could suffer as EVM performance may be improved, but ACPR performance may worsen, and vice versa. Advantageously, in accordance with embodiments of the present invention, a preferred delay is selected as shown in FIG. 7 such that the combination of the EVM for the signal and the ACPR for the signal is substantially minimized, although neither EVM nor ACPR is individually minimized.

Regulatory bodies may define maximum thresholds for EVM and/or ACPR with which a transmitter must comply. Therefore, in accordance with further embodiments of the present invention illustrated in the flowchart of FIG. 8 and the graphs of FIGS. 6 and 7, the delay adjustment module 86 determines a first range of delay values such that the EVM for the signal is less than a predefined EVM threshold at block 106. The delay adjustment module 86 determines a second range of delay values such that the ACPR for the signal is less than a predefined ACPR threshold at block 108. The first and second ranges of delay values identify those delay values that may be used to comply with predefined performance thresholds.

Figure 9:
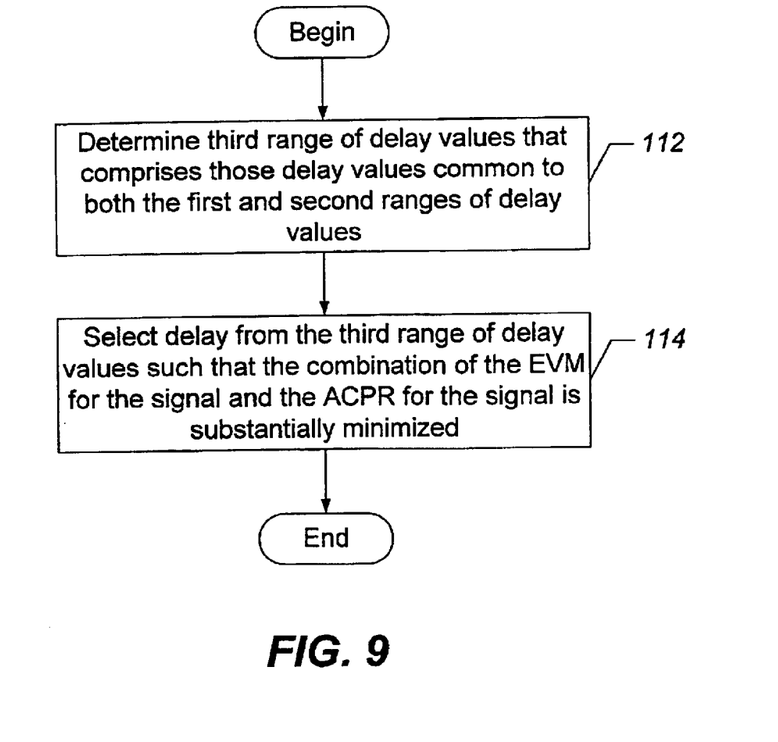

Referring now to the flowchart of FIG. 9 and the graphs of FIGS. 6 and 7, the delay adjustment module 86 determines a third range of delay values that comprises those delay values common to both the first and second ranges of delay values at block 112, in accordance with further embodiments of the present invention. The third range of delay values identifies those delay values that may be used to comply with both the EVM and ACPR performance thresholds. At block 114, the delay adjustment module 86 selects a preferred delay between an amplitude component of a signal and a phase component of the signal based on the transmit power of the signal from the third range of delay values, such that the combination of the EVM for the signal and the ACPR for the signal is substantially minimized.

Figure 10:
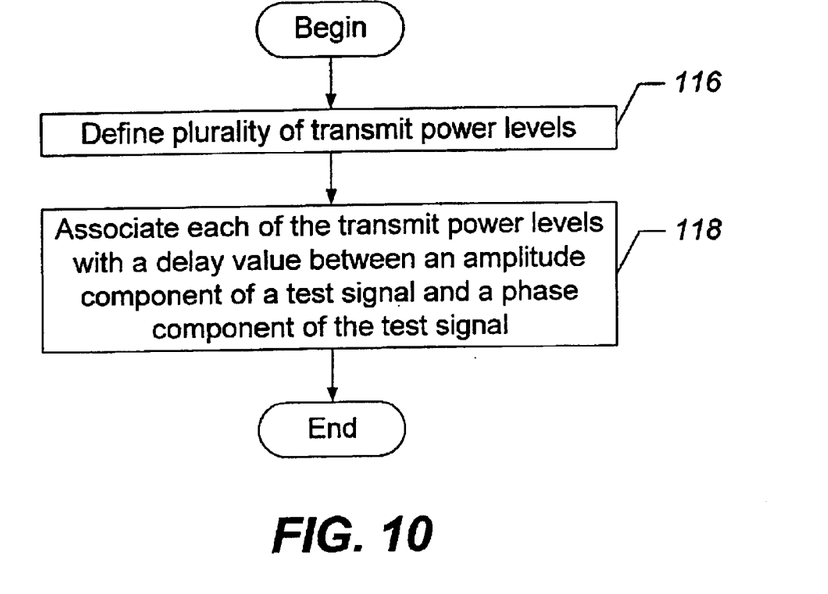

In accordance with further embodiments of the present invention illustrated in FIG. 10, a transmitter may be "pre-programmed" by defining a plurality of transmit power levels at block 116 and then associating each of the transmit power levels with a delay value between an amplitude component of a test signal and a phase component of the test signal at block 118. These associations between transmit power levels and delay values may be stored, for example, as a data structure in the data module 88. The associations may be stored in non-volatile memory so a communication device, such as a mobile terminal, may be programmed once during manufacturing and the associations used during the lifetime of the device.

Figure 11:
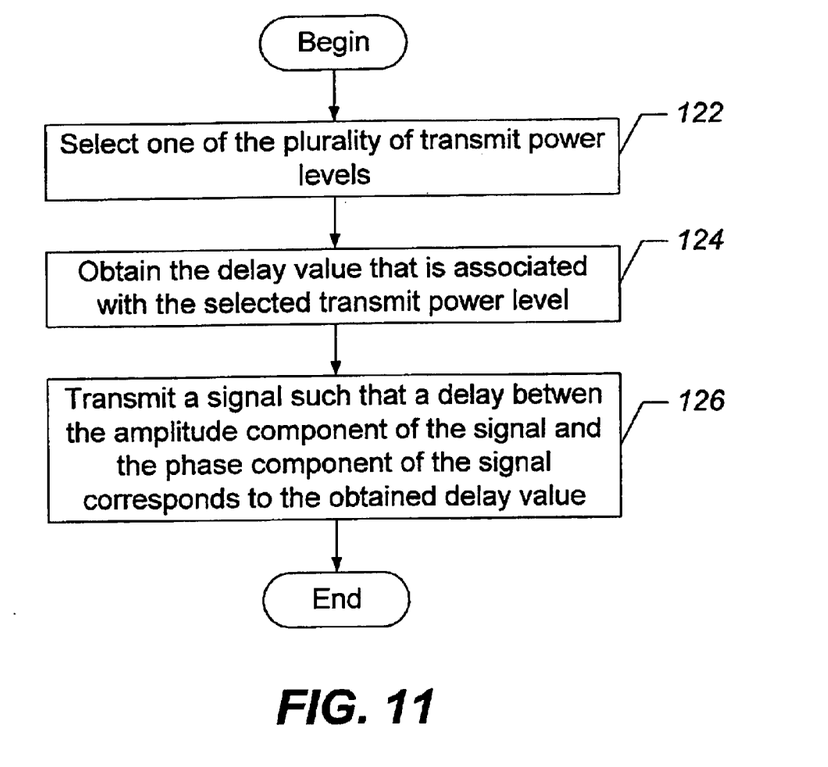

Referring now to FIG. 11, a transmitter selects one of the plurality of transmit power levels at block 122, in accordance with further embodiments of the present invention. The delay adjustment module 86 obtains the delay value that is associated with the selected transmit power level at block 124. The transmitter may then transmit a signal such that a delay between the amplitude component of the signal and the phase component of the signal corresponds to the obtained delay value at block 126.

The flowcharts of FIGS. 4–5 and 8–11 illustrate the architecture, functionality, and operations of a possible implementation of the delay adjustment module 86 software. In this regard, each block represents a module, segment, or portion of code, which comprises one or more executable instructions for implementing the specified logical function(s). It should also be noted that in some alternative implementations, the functions noted in the blocks may occur out of the order noted in FIGS. 4–5 and 8–11. For example, two blocks shown in succession may in fact be executed substantially concurrently or the blocks may sometimes be executed in the reverse order, depending on the functionality involved.

From the foregoing it can readily be seen that, in accordance with embodiments of the present invention, a transmitter may adjust the delay between the amplitude component of a signal and the phase component of the signal based on transmission power so as to improve EVM and/or ACPR performance. The particular delay value that provides the best error vector magnitude performance and the particular delay value that provides the best adjacent channel performance may not be the same. In accordance with further embodiments of the present invention, a delay between the amplitude component of the signal and the phase component of the signal is adjusted such that the combination of an error vector magnitude for the signal and an adjacent channel power ratio for the signal is substantially minimized.

Regulatory bodies may define maximum thresholds for error vector magnitude and/or adjacent channel power ratio with which a transmitter must comply. Therefore, in accordance with further embodiments of the present invention, a first range of delay values is determined for which the error vector magnitude is less than a predefined threshold. Similarly, a second range of delay values is determined for which the adjacent channel power ratio is less than a predefined threshold. A third range of delay values that comprises those delay values common to both the first and second ranges of delay values may then be determined. The delay values in the third range correspond to those delay values that allow the transmitter to satisfy the maximum thresholds for both error vector magnitude and adjacent channel power ratio. A delay value is selected from the third range of delay values such that the combination of the error vector magnitude for the signal and adjacent channel power ratio for the signal is substantially minimized.

In accordance with further embodiments of the present invention, a transmitter may be "pre-programmed" by defining a plurality of transmit power levels and associating a delay value between the amplitude component of a test signal and the phase component of a test signal with each of the transmit power levels. During operation, the transmitter selects one of the transmit power levels for transmission. The delay value that is associated with the selected transmit power level is obtained and then used by the transmitter during signal transmission.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

We claim:

1. A method of transmitting a signal, comprising:
   generating respective phase and amplitude signals for respective symbols;
   generating a radio signal that comprises the respective phase and amplitude signals for the respective symbols; and
   varying a timing between the respective phase and amplitude signals responsive to a transmit power for the radio signal.

2. The method of claim 1, wherein varying the timing between the respective phase and amplitude signals responsive to the transmit power for the radio signal comprises:
   varying the timing between the respective phase and amplitude signals to control at least one of an error vector magnitude and an adjacent channel power ratio for the radio signal.

3. A method of transmitting a signal, comprising:
   adjusting a delay between an amplitude component of the signal and a phase component of the signal based on a transmit power of the signal.

4. The method of claim 3, wherein adjusting the delay between the amplitude component of the signal and the phase component of the signal based on the transmit power of the signal comprises:
   adjusting the delay between the amplitude component of the signal and the phase component of the signal for the transmit power such that a combination of an error vector magnitude for the signal and an adjacent channel power ratio for the signal is substantially minimized.

5. The method of claim 4, wherein adjusting the delay between the amplitude component of the signal and the phase component of the signal for the transmit power such that the combination of the error vector magnitude for the signal and the adjacent channel power ratio for the signal is substantially minimized comprises:
   determining a first range of delay values between the amplitude component of the signal and the phase component of the signal for the transmit power such that the error vector magnitude for the signal is less than a predefined error vector magnitude threshold; and
   determining a second range of delay values between the amplitude component of the signal and the phase component of the signal for the transmit power such that the adjacent channel power ratio for the signal is less than a predefined adjacent channel power ratio threshold.

6. The method of claim 5, further comprising:
   determining a third range of delay values that comprises those delay values common to both the first range of delay values and the second range of delay values; and
   selecting the delay between the amplitude component of the signal and the phase component of the signal for the transmit power from the third range of delay values such that the combination of the error vector magnitude for the signal and the adjacent channel power ratio for the signal is substantially minimized.

7. The method of claim 3, wherein adjusting the delay between the amplitude component of the signal and the phase component of the signal based on the transmit power of the signal comprises:
   defining a plurality of transmit power levels for the signal; and
   determining respective delay values between the amplitude component of the signal and the phase component of the signal for respective ones of the defined plurality of transmit power levels such that a combination of an error vector magnitude for the signal and an adjacent channel power ratio for the signal is substantially minimized.

8. A method of operating a transmitter, comprising:
   separating a signal into an amplitude component and a phase component;
   selecting a transmit power for the signal;
   adjusting a delay between the amplitude component and the phase component based on the selected transmit power; and
   combining the amplitude component and the phase component.

9. The method of claim 8, wherein adjusting the delay between the amplitude component and the phase component comprises:
   adjusting the delay between the amplitude component and the phase component for the selected transmit power such that a combination of an error vector magnitude for the signal and an adjacent channel power ratio for the signal is substantially minimized.

10. The method of claim 9, wherein adjusting the delay between the amplitude component and the phase component for the selected transmit power such that the combination of the error vector magnitude for the signal and the adjacent channel power ratio for the signal is substantially minimized comprises:

determining a first range of delay values between the amplitude component and the phase component for the selected transmit power such that the error vector magnitude for the signal is less than a predefined error vector magnitude threshold; and determining a second range of delay values between the amplitude component and the phase component for the selected transmit power such that the adjacent channel power ratio for the signal is less than a predefined adjacent channel power ratio threshold.

11. The method of claim 10, further comprising:

determining a third range of delay values that comprises those delay values common to both the first range of delay values and the second range of delay values; and selecting the delay between the amplitude component and the phase component for the selected transmit power from the third range of delay values such that the combination of the error vector magnitude for the signal and the adjacent channel power ratio for the signal is substantially minimized.

12. A method of operating a transmitter, comprising:

defining a plurality of transmit power levels;

associating respective ones of a plurality of delay values between an amplitude component of a test signal and a phase component of a test signal with respective ones of the plurality of transmit power levels.

13. The method of claim 12, further comprising:

selecting one of the plurality of transmit power levels;

obtaining the delay value that is associated with the selected transmit power level;

transmitting a signal such that a delay between an amplitude component and a phase component of the transmitted signal corresponds to the obtained delay value.

14. The method of claim 12, wherein associating respective ones of the plurality of delay values between the amplitude component of the test signal and the phase component of the test signal with respective ones of the plurality of transmit power levels comprises:

determining respective delay values between the amplitude component of the test signal and the phase component of the test signal for respective ones of the defined plurality of transmit power levels such that a combination of an error vector magnitude for the signal and an adjacent channel power ratio for the signal is substantially minimized.

15. A transmitter, comprising:

means for generating respective phase and amplitude signals for respective symbols;

means for generating a radio signal that comprises the respective phase and amplitude signals for the respective symbols; and means for varying a timing between the respective phase and amplitude signals responsive to a transmit power for the radio signal.

16. The transmitter of claim 15, wherein the means for varying the timing between the respective phase and amplitude signals responsive to the transmit power for the radio signal comprises:

means for varying the timing between the respective phase and amplitude signals to control at least one of an error vector magnitude and an adjacent channel power ratio for the radio signal.

17. A transmitter, comprising:

means for providing a signal; and means for adjusting a delay between an amplitude component of the signal and a phase component of the signal based on a transmit power of the signal.

18. The transmitter of claim 17, wherein the means for adjusting the delay between the amplitude component of the signal and the phase component of the signal based on the transmit power of the signal comprises:

means for adjusting the delay between the amplitude component of the signal and the phase component of the signal for the transmit power such that a combination of an error vector magnitude for the signal and an adjacent channel power ratio for the signal is substantially minimized.

19. The transmitter of claim 18, wherein the means for adjusting the delay between the amplitude component of the signal and the phase component of the signal for the transmit power such that the combination of the error vector magnitude for the signal and the adjacent channel power ratio for the signal is substantially minimized comprises:

means for determining a first range of delay values between the amplitude component of the signal and the phase component of the signal for the transmit power such that the error vector magnitude for the signal is less than a predefined error vector magnitude threshold; and means for determining a second range of delay values between the amplitude component of the signal and the phase component of the signal for the transmit power such that the adjacent channel power ratio for the signal is less than a predefined adjacent channel power ratio threshold.

20. The transmitter of claim 19, further comprising:

means for determining a third range of delay values that comprises those delay values common to both the first range of delay values and the second range of delay values; and means for selecting the delay between the amplitude component of the signal and the phase component of the signal for the transmit power from the third range of delay values such that the combination of the error vector magnitude for the signal and the adjacent channel power ratio for the signal is substantially minimized.

21. The transmitter of claim 17, wherein the means for adjusting the delay between the amplitude component of the signal and the phase component of the signal based on the transmit power of the signal comprises:

means for defining a plurality of transmit power levels for the signal; and means for determining respective delay values between the amplitude component of the signal and the phase component of the signal for respective ones of the defined plurality of transmit power levels such that a combination of an error vector magnitude for the signal and an adjacent channel power ratio for the signal is substantially minimized.

22. A transmitter, comprising:

means for separating a signal into an amplitude component and a phase component;

means for selecting a transmit power for the signal;

means for adjusting a delay between the amplitude component and the phase component based on the selected transmit power; and means for combining the amplitude component and the phase component.

23. The transmitter of claim 22, wherein the means for adjusting the delay between the amplitude component and the phase component comprises:

means for adjusting the delay between the amplitude component and the phase component for the selected transmit power such that a combination of an error vector magnitude for the signal and an adjacent channel power ratio for the signal is substantially minimized.

24. The transmitter of claim 23, wherein the means for adjusting the delay between the amplitude component and the phase component for the selected transmit power such that the combination of the error vector magnitude for the signal and the adjacent channel power ratio for the signal is substantially minimized comprises:

means for determining a first range of delay values between the amplitude component and the phase component for the selected transmit power such that the error vector magnitude for the signal is less than a predefined error vector magnitude threshold; and means for determining a second range of delay values between the amplitude component and the phase component for the selected transmit power such that the adjacent channel power ratio for the signal is less than a predefined adjacent channel power ratio threshold.

25. The transmitter of claim 24, further comprising:

means for determining a third range of delay values that comprises those delay values common to both the first range of delay values and the second range of delay values; and means for selecting the delay between the amplitude component and the phase component for the selected transmit power from the third range of delay values such that the combination of the error vector magnitude for the signal and the adjacent channel power ratio for the signal is substantially minimized.

26. A transmitter, comprising:

means for defining a plurality of transmit power levels;

means for associating respective ones of a plurality of delay values between an amplitude component of a test signal and a phase component of a test signal with respective ones of the plurality of transmit power levels.

27. The transmitter of claim 26, further comprising:

means for selecting one of the plurality of transmit power levels;

means for obtaining the delay value that is associated with the selected transmit power level;

means for transmitting a signal such that a delay between an amplitude component and a phase component of the transmitted signal corresponds to the obtained delay value.

28. The transmitter of claim 26, wherein the means for associating respective ones of the plurality of delay values between the amplitude component of the test signal and the phase component of the test signal with respective ones of the plurality of transmit power levels comprises:

means for determining respective delay values between the amplitude component of the test signal and the phase component of the test signal for respective ones of the defined plurality of transmit power levels such that a combination of an error vector magnitude for the signal and an adjacent channel power ratio for the signal is substantially minimized.

29. A computer program product for transmitting a signal, comprising:

a computer readable program medium having computer readable program code embodied therein, the computer readable program code comprising:

computer readable program code for generating respective phase and amplitude signals for respective symbols;

computer readable program code for generating a radio signal that comprises the respective phase and amplitude signals for the respective symbols; and computer readable program code for varying a timing between the respective phase and amplitude signals responsive to a transmit power for the radio signal.

30. The computer program product of claim 29, wherein the computer readable program code for varying the timing between the respective phase and amplitude signals responsive to the transmit power for the radio signal comprises:

computer readable program code for varying the timing between the respective phase and amplitude signals to control at least one of an error vector magnitude and an adjacent channel power ratio for the radio signal.

31. A computer program product for transmitting a signal, comprising:

a computer readable program medium having computer readable program code embodied therein, the computer readable program code comprising:

computer readable program code for adjusting a delay between an amplitude component of the signal and a phase component of the signal based on a transmit power of the signal.

32. The computer program product of claim 31, wherein the computer readable program code for adjusting the delay between the amplitude component of the signal and the phase component of the signal based on the transmit power of the signal comprises:

computer readable program code for adjusting the delay between the amplitude component of the signal and the phase component of the signal for the transmit power such that a combination of an error vector magnitude for the signal and an adjacent channel power ratio for the signal is substantially minimized.

33. The computer program product of claim 32, wherein the computer readable program code for adjusting the delay between the amplitude component of the signal and the phase component of the signal for the transmit power such that the combination of the error vector magnitude for the signal and the adjacent channel power ratio for the signal is substantially minimized comprises:

computer readable program code for determining a first range of delay values between the amplitude component of the signal and the phase component of the signal for the transmit power such that the error vector magnitude for the signal is less than a predefined error vector magnitude threshold; and computer readable program code for determining a second range of delay values between the amplitude component of the signal and the phase component of the signal for the transmit power such that the adjacent channel power ratio for the signal is less than a predefined adjacent channel power ratio threshold.

34. The computer program product of claim 33, further comprising:

computer readable program code for determining a third range of delay values that comprises those delay values common to both the first range of delay values and the second range of delay values; and computer readable program code for selecting the delay between the amplitude component of the signal and the phase component of the signal for the transmit power from the third range of delay values such that the combination of the error vector magnitude for the signal and the adjacent channel power ratio for the signal is substantially minimized.

35. The computer program product of claim 31, wherein the computer readable program code for adjusting the delay between the amplitude component of the signal and the phase component of the signal based on the transmit power of the signal comprises:

computer readable program code for defining a plurality of transmit power levels for the signal; and computer readable program code for determining respective delay values between the amplitude component of the signal and the phase component of the signal for respective ones of the defined plurality of transmit power levels such that a combination of an error vector magnitude for the signal and an adjacent channel power ratio for the signal is substantially minimized.

36. A computer program product for operating a transmitter, comprising:

a computer readable program medium having computer readable program code embodied therein, the computer readable program code comprising:

computer readable program code for separating a signal into an amplitude component and a phase component;

computer readable program code for selecting a transmit power for the signal;

computer readable program code for adjusting a delay between the amplitude component and the phase component based on the selected transmit power; and computer readable program code for combining the amplitude component and the phase component.

37. The computer program product of claim 36, wherein the computer readable program code for adjusting the delay between the amplitude component and the phase component comprises:

computer readable program code for adjusting the delay between the amplitude component and the phase component for the selected transmit power such that a combination of an error vector magnitude for the signal and an adjacent channel power ratio for the signal is substantially minimized.

38. The computer program product of claim 37, wherein the computer readable program code for adjusting the delay between the amplitude component and the phase component for the selected transmit power such that the combination of the error vector magnitude for the signal and the adjacent channel power ratio for the signal is substantially minimized comprises:

computer readable program code for determining a first range of delay values between the amplitude component and the phase component for the selected transmit power such that the error vector magnitude for the signal is less than a predefined error vector magnitude threshold; and computer readable program code for determining a second range of delay values between the amplitude component and the phase component for the selected transmit power such that the adjacent channel power ratio for the signal is less than a predefined adjacent channel power ratio threshold.

39. The computer program product of claim 38, further comprising:

computer readable program code for determining a third range of delay values that comprises those delay values common to both the first range of delay values and the second range of delay values; and computer readable program code for selecting the delay between the amplitude component and the phase component for the selected transmit power from the third range of delay values such that the combination of the error vector magnitude for the signal and the adjacent channel power ratio for the signal is substantially minimized.

40. A computer program product for operating a transmitter, comprising:

a computer readable program medium having computer readable program code embodied therein, the computer readable program code comprising:

computer readable program code for defining a plurality of transmit power levels;

computer readable program code for associating respective ones of a plurality of delay values between an amplitude component of a test signal and a phase component of a test signal with respective ones of the plurality of transmit power levels.

41. The computer program product of claim 40, further comprising:

computer readable program code for selecting one of the plurality of transmit power levels;

computer readable program code for obtaining the delay value that is associated with the selected transmit power level;

computer readable program code for transmitting a signal such that a delay between an amplitude component and a phase component of the transmitted signal corresponds to the obtained delay value.

42. The computer program product of claim 40, wherein the computer readable program code for associating respective ones of the plurality of delay values between the amplitude component of the test signal and the phase component of the test signal with respective ones of the plurality of transmit power levels comprises:

computer readable program code for determining respective delay values between the amplitude component of the test signal and the phase component of the test signal for respective ones of the defined plurality of transmit power levels such that a combination of an error vector magnitude for the signal and an adjacent channel power ratio for the signal is substantially minimized.

* * * * *